United States Patent [19]

Kimura et al.

[11] Patent Number: 5,319,050
[45] Date of Patent: Jun. 7, 1994

[54] ROOM TEMPERATURE FAST-CURING COMPOSITION

[75] Inventors: Tsuneo Kimura; Masatoshi Arai, both of Annaka, Japan

[73] Assignee: Shin-Etsu Chemical Co., Ltd., Tokyo, Japan

[21] Appl. No.: 40,096

[22] Filed: Mar. 30, 1993

[30] Foreign Application Priority Data

Mar. 30, 1992 [JP] Japan .................................. 4-129263

[51] Int. Cl.$^5$ .............................................. C08G 77/06
[52] U.S. Cl. ...................................... 528/12; 528/21; 528/22; 528/34; 528/41; 528/901
[58] Field of Search .................. 528/21, 22, 12, 34, 528/41, 901

[56] References Cited

U.S. PATENT DOCUMENTS

| | | | |
|---|---|---|---|
| 3,161,614 | 12/1964 | Brown et al. | 528/34 |
| 3,888,815 | 6/1975 | Bessmer et al. | 528/34 |
| 4,220,748 | 9/1980 | Hashimoto et al. | |
| 4,810,768 | 3/1989 | Wong | 528/21 |

FOREIGN PATENT DOCUMENTS

| | | |
|---|---|---|
| 0208963 | 1/1987 | European Pat. Off. . |
| 3607071 | 9/1986 | Fed. Rep. of Germany . |
| 2236911 | 2/1975 | France . |

OTHER PUBLICATIONS

Patent Abstracts of Japan, vol. 016, No. 066, Feb. 19, 1992 and JP-A-3263421, Nov. 22, 1991.

*Primary Examiner*—Melvyn I. Marquis
*Attorney, Agent, or Firm*—Oblon, Spivak, McClelland, Maier & Neustadt

[57] ABSTRACT

A condensation-curing type curable composition which comprises a diorganopolysiloxane or polyoxyalkylene blocked by hydrolyzable silyl group at both terminal ends of its molecular chain as a base polymer, in which a carbonyl group-containing organic compound and an amino group-containing organic compound are compounded. This composition is capable of forming water through dehydration condensation between carbonyl and amino groups, simultaneously with curing of the composition by moisture in air. The formation of water offers marked improvements in fast-curing property and also in depth curing property.

5 Claims, No Drawings

ROOM TEMPERATURE FAST-CURING COMPOSITION

BACKGROUND OF THE INVENTION

1. Field of the Invention

The present invention relates to a room temperature fast-curing composition, and more particularly to a condensation-curing type room temperature fast-curing composition which has good fast-curing property and depth curing property (i.e., property for curing to deep, or inside, portions thereof).

2. Description of the Prior Art

As a condensation-curing type room temperature fast-curing composition, there have been known those of one-pack type in which the amount of crosslinking agent is reduced to an utmost degree so as to enhance curing rate and those of two-pack type in which a crosslinking agent and a curing agent are enclosed in separate packs.

However, the one-pack type compositions have only the advantage of high rate of cure from the surface thereof, and they need a certain period of time for curing to their deep portions. Thus, such compositions cannot be said really "fast-curing".

The two-pack type compositions are comparatively better in depth curing properties. However, the two-pack type compositions are bothersome to deal with, and are not well suited to use with mixing machines or the like, because the two parts in separate packs are not formulated for a mixing ratio of 1:1. Furthermore, for complete cure to the depth, it is necessary to specify strictly the addition amounts of crosslinking agent and curing agent or to add water as a depth curing agent.

On the other hand, addition-curable organopolysiloxane compositions of two-pack type are superior in workability, because the two parts in separate packs are formulated for a 1:1 mixing ratio. However, this type of compositions usually require a heating furnace for curing. Besides, they have limitations as to working atmospheres because a curing catalyst used therein is poisoned in the presence of a substance poisonous to the catalyst or to the addition reaction.

SUMMARY OF THE INVENTION

It is accordingly an object of the present invention to provide a condensation-curing type room temperature fast-curing composition which has an excellent room temperature fast-curing property and, also, a good depth curing property.

According to the present invention, there is provided a room temperature fast-curing composition comprising:

(A) a diorganopolysiloxane or polyoxyalkylene polymer blocked by hydrolyzable silyl group at both terminal ends of molecular chain thereof and having a viscosity at 25° C. of from 25 to 1,000,000 cSt;

(B) an organic compound having at least one carbonyl group in its molecule, present in an amount such as to provide from 0.001 to 1 mole of carbonyl groups per 100 g of the component (A); and (C) an organic compound having at least one $NH_2$ group in its molecule, present in an amount such as to provide from 0.001 to 1 mole of $NH_2$ groups per 100 g of the component (A), said components (B) and (C) being so selected that the carbonyl group and the $NH_2$ group therein are reactive to each other.

Thus, according to the present invention, water required for condensation curing of the composition is not supplied by direct addition of water but is formed in the composition through a reaction between an organic compound having a C=O double bond and an organic compound having an $NH_2$ group, whereby the depth curing property and fast-curing property of the composition are improved.

That is, according to the invention, concurrently with a crosslinking reaction taking place in the presence of moisture in air, the compound of component (B) and the compound of component (C) perform a dehydration condensation reaction represented by the following formula (1):

$$(R)_2C=O + H_2NR' \rightarrow (R)_2C=NR' + H_2O \quad (1)$$

wherein R and R' are each an organic group, to form water in deep portions of the composition. The formation of water improves the fast-curing property of the composition, and improves markedly the depth curing property of the composition. Consequently, the problems encountered in the prior art due to the addition of water as a depth curing agent, such as separation of water, a lowered workability arising from an increase in thixotropy, and the like, can be overcome.

Component (A)

The component (A), serving as base polymer of the composition of the present invention, is at least one member selected from the group consisting of diorganopolysiloxanes and polyoxyalkylenes.

In the present invention, each of the base polymers should be blocked by hydrolyzable silyl group at both terminal ends of its molecular chain. That is, due to the presence of the hydrolyzable groups, the polymers undergo hydrolysis and polycondensation in the presence of water, to form a cured product which has rubber-like elasticity. The hydrolyzable silyl group is a group having at least one hydrolyzable group attached to a silicon atom. The hydrolyzable groups include, for example, carboxyl, ketoxime, alkoxyl, alkenoxyl, amino, aminoxyl and amide groups, and the like. The number of such hydrolyzable groups attached to a silicon atom is not limited to one; namely, two or three hydrolyzable groups may be attached to the same silicon atom. In addition, to the silicon atom having the hydrolyzable group or groups attached thereto, other organic groups may of course be attached. The other organic groups include, for example, alkyl groups such as methyl, ethyl, propyl, and the like; cycloalkyl groups such as cyclohexyl, and the like; alkenyl groups such as vinyl, allyl, and the like; aryl groups such as phenyl, tolyl, and the like; and groups derived from these by substitution of halogen atoms or the like for part of the hydrogen atoms of these, for example, chloromethyl, 3,3,3-trifluoropropyl, and the like.

The base polymer, or the component (A), should have a viscosity at 25° C. in the range from 25 to 1,000,000 cSt. If the viscosity is outside of the range, cured rubber products with satisfactory properties are hardly obtainable or workability is lowered.

Among the base polymers as described above, suitable examples of the diorganopolysiloxanes include the compounds having the following general formula (2):

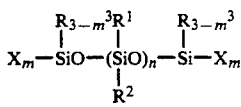

(2)

wherein $R^1$ to $R^3$, may be the same or different from each other and are each an unsubstituted or substituted monovalent hydrocarbon group, X is the hydrolyzable group as described above, m is an integer from 1 to 3, and n is a positive integer.

The groups $R^1$ to $R^3$ in the above general formula (2) include, for example, organic groups other than the hydrolyzable groups in the hydrolyzable silyl group. Besides, n is ordinarily an integer of 10 or above, in view of the diorganopolysiloxane having a viscosity in the above-described range.

On the other hand, the polyoxyalkylene polymers among the above-described base polymers include, for example, those in which the oxyalkylene unit constituting the backbone is $-CH_2CH_2O-$, $-CH_2CH(CH_3)O-$, $-CH_2CH(CH_2CH_3)O-$, $-CH_2CH_2CH_2CH_2O-$, or the like. Among the polyoxyalkylene polymers, those whose backbone is constituted of the $-CH_2CH(CH_3)O-$ unit are particularly preferred, in view of availability and cost. Of course, these kinds of oxyalkylene units may be present either singly or in combination of two or more, to make up the backbone of the polyoxyalkylene polymer. Besides, the above-described hydrolyzable silyl group can be introduced into both terminal ends of the backbone consisting of such oxyalkylene groups, by any of a number of methods. For example, a method may be used in which an oxyalkylene polymer having an allyl group at a terminal end thereof and a hydrosilane having a hydrolyzable silyl group are brought into an addition reaction in the presence of a platinum catalyst. In an alternative method which is also applicable, an oxyalkylene polymer having an allyl group at a terminal end thereof and a halogenated alkylsilane having a hydrolyzable silyl group are brought into a condensation reaction in the presence of metallic sodium or metallic potassium.

Component (B)

The carbonyl group-containing compound of the component (B) reacts with the amino group-containing organic compound of the component (C) described below, to form water in the depth (i.e., deep, or inside, portions) of the composition, the water acting as a curing agent.

The organic compound for this purpose may be any one that has a reactive carbonyl group capable of performing the reaction represented by the above formula (1). In general, the usable organic compounds include, for example, ketones such as acetone, methyl ethyl ketone, acetophenone and the like; esters such as ethyl acetate, butyl acetate, methyl propionate, ethyl acrylate, butyrolactone and the like; amides such as dimethyl-formamide, diethylacetamide, butyrolactam and the like; carboxylic acids such as acetic acid, propionic acid, benzoic acid and the like; silane coupling agents having a carbonyl group as a functional group; carbonyl group-containing polymers and oligomers, and the like. In the present invention, from the viewpoint of steric hindrance of the component (C) at the time of reaction, those carbonyl group-containing organic compounds in which the carbon atom at the α-position with respect to the carbonyl group is a primary carbon atom, a secondary carbon atom or a part of an aromatic ring are used particularly preferably. If the carbon atom at the α-position is a tertiary carbon atom, the carbonyl group is poor in reactivity with amino groups, and the desired effect may be unobtainable. These carbonyl group-containing organic compounds may be used either singly or in combination of two or more.

The component (B) should be compounded in an amount such that the amount of the carbonyl groups thereof is in the range from 0.001 to 1 mole, preferably from 0.01 to 0.1 mole, per 100 g of the component (A). If the amount of the carbonyl groups is less than 0.001 mole, satisfactory depth curing properties are not exhibited. If the amount exceeds 1 mole, on the other hand, the elastic cured product obtained will not exhibit the desired physical properties.

Component (C)

The amino group-containing organic group of the component (C), as has been described above, reacts with the component (B) to form water, which acts as a curing agent, in the depth of the composition.

Such organic compounds may be any one that has a reactive amino group capable of the reaction represented by the formula (1) above. In general, the organic compounds include, for example, aliphatic and aromatic amines such as methylamine, ethylamine, butylamine, ethylenediamine, aniline and the like; silane coupling agents having an $NH_2$ group as a functional group, such as gamma-aminopropyltriethoxysilane and the like; and $NH_2$ group-containing polymers and oligomers. In the present invention, from the viewpoint of steric hindrance of the component (B) at the time of reaction, those amino group-containing organic compounds in which the carbon atom at the α-position with respect to the amino group is a primary carbon atom, a secondary carbon atom or a part of an aromatic ring are particularly preferred for use. If the carbon atom at the α-position is a tertiary carbon atom, the amino group is poorly reactive with carbonyl groups, and the desired effect may not be obtainable. These amino group-containing organic compounds may be used either singly or in combination of two or more.

The component (C) should be compounded in an amount such that the amount of the amino groups thereof ranges from 0.001 to 1 mole, preferably from 0.01 to 0.1 mole, per 100 g of the component (A). If the amount of the amino groups is less than 0.001 mole, satisfactory depth curing properties are not exhibited. If the amount is more than 1 mole, on the other hand, the elastic cured product obtained will not exhibit the desired physical properties.

Curable composition

The composition according to the present invention can be obtained as a one-pack type room temperature fast-curing composition by uniformly mixing predetermined amounts of the above-described components (A) to (C) in a dry atmosphere. In order to obtain assured shelf stability, the composition may be formulated as a one-pack type room temperature fast-curing composition in which the component (B) or (C) is present in a microencapsulated state, or may be prepared as a two-pack type composition to be mixed when used. In the latter case, the two parts in separate packs can be formulated for a mixing ratio of 1:1.

To the composition of the invention, a variety of compounding agents can be added, provided neither of the fast-curing property at room temperature and depth curing property of the composition is thereby damaged. For example, curing catalysts such as organotin ester, organotitanic acid ester, tetramethylguanidyl-propyltrimethoxysilane and the like, stabilizers such as methyltrimethoxysilane, methyltripropenoxysilane, vinyltributanoximesilane, methyltriacetoxysilane and the like, reinforcing agents such as fumed silica, precipitated silica, titanium dioxide, aluminum oxide, ground quartz, carbon powder, talc, bentonite and the like, fibrous fillers such as asbestos, glass fibers, organic fibers and the like, coloring agents such as pigments, dyes and the like, heat resistance improving agents such as red oxide, cerium oxide and the like, cold resistance improving agents, dehydrating agents, rust preventives, adhesion-improving agents such as gamma-glycidoxypropyltriethoxysilane and the like, liquid reinforcing agents such as network polysiloxanes comprised of triorganosiloxy units and $SiO_2$ units, and the like can be added to the composition in desired amounts, as required.

In the present invention, it is important that the components (B) and (C) react with each other as represented by the formula (1) above to form water, which serves as a depth curing agent. Therefore, the components (B) and (C) are naturally selected in such a manner as to ensure that the reaction takes place quickly. Furthermore, various compounding agents which are added to the composition as desired are selected so as not to hinder the formation of water.

In the present invention, preferable combinations of the carbonyl group-containing organic compound (the component (B)) with the $NH_2$ group-containing organic compound (the component (C)) are as follows:

Acetone/gamma-Aminopropyltrimethoxysilane,
Acetone/gamma-Aminopropyltriethoxysilane,
Acetone/Ethylenediaminopropyltrimethoxysilane,
Acetone/Ethylenediaminopropyltriethoxysilane,
Acetone/alpha,omega-Dihydroxyaminopropylmethyl-polysiloxane,
Acetone/alpha,omega-Dihydroxyethylenediamino -propylmethylpolysiloxane,
Methyl ethyl ketone/gamma-Aminopropyltrimethoxysilane,
Methyl ethyl ketone/gamma-Aminopropyltriethoxysilane,
Methyl ethyl ketone/Ethylenediaminopropyltrimethoxy-silane,
Methyl ethyl ketone/Ethylenediaminopropyltriethoxy-silane,
Methyl ethyl ketone/alpha,omega-Dihydroxyaminopropyl -methylpolysiloxane,
Methyl ethyl ketone/alpha,omega-Dihydroxyethylene -diaminopropylmethylpolysiloxane,
Cyclohexanone/gamma-Aminopropyltrimethoxysilane,
Cyclohexanone/gamma-Aminopropyltriethoxysilane,
Cyclohexanone/Ethylenediaminopropyltrimethoxysilane,
Cyclohexanone/Ethylenediaminopropyltriethoxysilane,
Cyclohexanone/n-Butylamine,
Cyclohexanone/sec-Butylamine,
Cyclohexanone/Cyclohexylamine,
Cyclohexanone/1,6-Hexamethylenediamine,
Cyclohexanone/alpha,omega-Dihydroxyaminopropylmethyl -polysiloxane, and
Cyclohexanone/alpha,omega-Dihyiroxyethylenediamino propylmethylpolysiloxane.

The composition according to the present invention as described above cures in the presence of moisture in air and, simultaneously with the curing, water is formed in deep portions of the composition. Thus, curing of the composition proceeds not only from the surface but also from the inside of the composition. Accordingly, the composition exhibits greatly improved fast-curing property and depth curing property.

Besides, the composition of the present invention has the characteristic feature that where it is prepared as a two-pack type composition for mixing at the time of use, the two parts in separate packs can be formulated easily for a mixing ratio of 1:1. Furthermore, the components (B) and (C) are easily available, which renders the composition extremely high in practicability.

The composition according to the present invention, due to its excellent fast-curing and depth curing properties, is suitable as an oil seal material for automobiles and can be used advantageously as sealant and potting material in electric and electronic industries where rationalization of manufacturing steps is keenly requested in recent years.

EXAMPLES

Some examples of the present invention and comparative examples will now be described below, in which viscosity is given in values measured at 25° C.

Comparative Example 1

One hundred (100) grams of a dimethylpolysiloxane blocked by trimethoxysilyl group at both terminal ends of its molecular chain and having a viscosity of 5,000 cSt, 0.2 g of dibutyltin dilaurate, 50 g of precipitated silica, and 8 g of fumed silica were mixed under waterless conditions to prepare a curable silicone rubber composition.

From the composition thus obtained, a sheet 2 mm thick was formed and left to stand in an atmosphere of 20° C. and 50% relative humidity for 1 hour, to form a rubber-like elastic material. The elastic material thus obtained was tested for rubber properties according to JIS K 6301. The results are shown in Table 1.

In addition, the above composition was poured into a cylindrical glass tube 20 mm in diameter and 100 mm in length, and cured in an atmosphere of 20° C. and 55% relative humidity for 24 hours. After the curing, the cured product was taken out by breaking the glass tube, and the thickness of a rubber-like elastic material portion of the cured product was measured. The thickness was 4 mm.

Example 1

One hundred (100) grams of a dimethylpolysiloxane blocked by trimethoxysilyl group at both terminal ends of its molecular chain and having a viscosity of 5,000 cSt, 0.58 g (0.01 mol) of acetone, 1.29 g (0.01 mol) of normal butylamine, 0.2 g of dibutyltin dilaurate, 50 g of precipitated silica, and 8 g of fumed silica were mixed under waterless conditions, to prepare a curable silicone rubber composition.

The composition obtained was tested for rubber properties in the same manner as in Comparative Example 1. The results are shown in Table 1.

Also, the composition was cured by use of a cylindrical glass tube, in the same manner as in Comparative Example 1, and the thickness of a rubber-like elastic material portion of the cured product was measured to be 100 mm. This shows that the composition according to the present invention is excellent in depth curing properties.

Comparative Example 2

One hundred (100) grams of a dimethylpolysiloxane blocked by vinyldiisopropenoxysilyl group at both terminal ends of its molecular chain and having a viscosity of 20,000 cSt, 1.0 g of tetramethylguanidylpropyl -trimethoxysilane, and 10 g of fumed silica were mixed with each other under waterless conditions, to prepare a curable silicone rubber composition.

The composition obtained was tested for rubber properties in the same manner as in Comparative Example 1. The results are shown in Table 1.

Example 2

One hundred (100) grams of a dimethylpolysiloxane blocked by vinyldiisopropenoxysilyl group at both terminal ends of its molecular chain and having a viscosity of 20,000 cSt, 0.58 g (0.01 mol) of acetone, 2.21 g (0.01 mol) of gamma-aminopropyltriethoxysilane, 1.0 g of tetramethylguanidylpropyltrimethoxysilane, and 10 g of fumed silica were mixed together under waterless conditions, to prepare a curable silicone rubber composition.

The composition thus obtained was tested for rubber properties in the same manner as in Comparative Example 1. The results are shown in Table 1.

Comparative Example 3

One hundred (100) grams of a polypropylene oxide blocked by vinyldiisopropenoxysilyl group at both terminal ends of its molecular chain and having a viscosity of 4,500 cSt, 1.0 g of dibutyltin dioctoate, and 200 g of calcium carbonate were mixed together under waterless conditions, to prepare a curable silicone rubber composition.

The composition obtained was tested for rubber properties in the same manner as in Comparative Example 1. The results are shown in Table 1.

Example 3

One hundred (100) grams of a polypropylene oxide blocked by vinyldiisopropenoxysilyl group at both terminal ends of its molecular chain and having a viscosity of 4,500 cSt, 12.4 g (0.05 mol) of gamma-methacryloxypropyl -trimethoxysilane, 11.1 g (0.05 mol) of gamma-aminopropyl-triethoxysilane, 1.0 g of dibutyltin dioctoate, and 200 g of calcium carbonate were mixed with each other under waterless conditions, to prepare a curable silicone rubber composition.

The composition thus obtained was tested fur rubber properties in the same manner as in Comparative Example 1. The results are shown in Table 1.

TABLE 1

| Rubber properties | Comp. Ex. 1 | Ex. 1 | Comp. Ex. 2 | Ex. 2 | Comp. Ex. 3 | Ex. 3 |
| --- | --- | --- | --- | --- | --- | --- |
| Hardness | * | 20 | * | 15 | * | 30 |
| Elongation (%) | * | 300 | * | 620 | * | 300 |
| Tensile strength (kgf/cm²) | * | 18 | * | 20 | * | 10 |

Note:
*Measurement was impossible to accomplish.

Hardness measurement was carried out on a Type A spring hardness tester according to JIS K 6301.

We claim:

1. A room temperature fast-curing composition comprising:
   (A) a diorganopolysiloxane or polyoxyalkylene polymer blocked by hydrolyzable silyl group at both terminal ends of its molecular chain and having a viscosity of 25° C. of from 25 to 1,000,000 cSt;
   (B) an organic compound having at least one carbonyl group in its molecule, present in an amount such as to provide from 0.001 to 1 mole of carbonyl groups per 100 g of the component (A); and
   (C) an organic compound having at least one NH$_2$ group in its molecule, present in an amount such as to provide from 0.001 to 1 mole of NH$_2$ groups per 100 g of the component (A),
   said components (B) and (C) being so selected that the carbonyl group and the NH$_2$ group therein are reactive to each other,
   wherein said carbonyl group-containing organic compound is at least one member selected from the group consisting of ketones, esters, amides, carboxylic acids, and carbonyl group-containing silane coupling agents, and
   wherein said NH$_2$ group-containing organic compound is a compound selected from the group consisting of aliphatic amines, aromatic amines, NH$_2$ group-containing silane coupling agents, and NH$_2$ group-containing polymers and oligomers.

2. The composition according to claim 1, wherein said carbonyl group-containing organic compound is acetone or gamma-methacryloxypropyltrimethoxysilane.

3. The composition according to claim 1, wherein said NH$_2$ group-containing organic compound is n-butylamine or gamma-aminopropyltriethoxysilane.

4. The composition according to claim 1, wherein said diorganopolysiloxane is a compound having the following general formula:

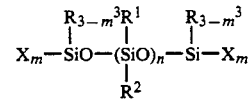

wherein $R^1$ and $R^3$ may be the same or different from each other and are each an unsubstituted or substituted monovalent hydrocarbon group, X is a hydrolyzable group, m is an integer from 1 to 3, and n is a positive integer.

5. The composition according to claim 1, wherein said polyoxyalkylene polymer has a main chain constituted of at least one unit selected from the group consisting of:

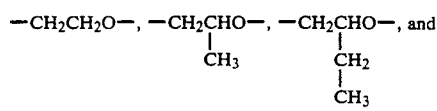

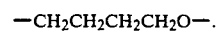

* * * * *